(12) United States Patent
Torudbaken et al.

(10) Patent No.: US 7,483,442 B1
(45) Date of Patent: Jan. 27, 2009

(54) VCRC CHECKING AND GENERATION

(75) Inventors: Ola Torudbaken, Oslo (NO); Hans Rygh, Oslo (NO); Steinar Forsmo, Oslo (NO); Morten Schanke, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 850 days.

(21) Appl. No.: 10/863,013

(22) Filed: Jun. 8, 2004

(51) Int. Cl.
*H04L 12/28* (2006.01)
*H04L 12/56* (2006.01)
*H04L 12/50* (2006.01)
*G06F 13/00* (2006.01)

(52) U.S. Cl. ........................ 370/412; 370/360; 370/392; 370/419; 710/316

(58) Field of Classification Search ................. 370/252, 370/360, 389, 392, 400, 401, 411, 412, 419, 370/447, 462; 709/238; 710/316; 714/752, 714/758
See application file for complete search history.

(56) References Cited

U.S. PATENT DOCUMENTS

| | | | |
|---|---|---|---|
| 6,898,752 B2 * | 5/2005 | Tucker | 714/752 |
| 6,988,161 B2 * | 1/2006 | McConnell et al. | 710/316 |
| 7,185,062 B2 * | 2/2007 | Lolayekar et al. | 709/213 |
| 2003/0223435 A1 * | 12/2003 | Gil | 370/400 |
| 2004/0001487 A1 * | 1/2004 | Tucker et al. | 370/389 |
| 2004/0001503 A1 * | 1/2004 | Manter | 370/462 |
| 2004/0022245 A1 * | 2/2004 | Forbes et al. | 370/392 |
| 2004/0022257 A1 * | 2/2004 | Green et al. | 370/401 |
| 2004/0024903 A1 * | 2/2004 | Costatino et al. | 709/238 |

* cited by examiner

*Primary Examiner*—Ronald Abelson
(74) *Attorney, Agent, or Firm*—Park, Vaughan & Fleming LLP

(57) ABSTRACT

An Infiniband switch can be provided. The switch can have an input port logic unit for determining an output virtual lane for a received packet and for storing a descriptor of the determined output virtual lane in a packet field not protected by a checksum field of the packet. The switch can also have a routing unit for transferring the received packet to an output port corresponding to the determined output virtual lane. Additionally, the switch can have an output port logic unit for simultaneously checking the integrity of the packet transferred through the routing unit and calculating a new value for the checksum with the descriptor moved to a correct packet field, which field is included in the calculation of the checksum.

16 Claims, 7 Drawing Sheets ns, all of which are filed on the same day and assigned to
VCRC CHECKING AND GENERATION

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" (application Ser. No. 10/863,019 filed 8 Jun. 2004, Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" (application Ser. No. 10/863,016 filed 8 Jun. 2004), Inventors: Bjorn Dag Johnsen, Hans Rygh and Morten Schanke;

"SWITCHING METHOD AND APPARATUS FOR USE IN A COMMUNICATIONS NETWORK" (application Ser. No. 10/862,970 filed 8 Jun. 2004), Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" (application Ser. No. 10/863,854 filed 8 Jun. 2004), Inventors: Bjorn Dag Johnsen, Christopher Jackson, David Brean, Ola Torudbakken;

"CREDIT ANNOUNCEMENT" (application Ser. No. 10/863,373 filed 8 Jun. 2004), Inventors: Morten Schanke, Hans Rygh, Marius Hansen and Mathias Hoddevik;

"ADAPTIVE CUT-THROUGH ALGORITHM" (application Ser. No. 10/862,987, filed 8 Jun. 2004), Inventors: Morten Schanke, Brian Manula and Magne Sandven;

"COMMA DETECTION" (application Ser. No. 10/863,374 filed 8 Jun. 2004), Inventors: Magne Sandven, Morten Schanke and Brian Manula;

"SERVICE LEVEL TO VIRTUAL LANE MAPPING" (application Ser. No. 10/862,985, filed 8 Jun. 2004), Inventors: Steinar Forsmo, Hans Rygh and Ola Torudbakken;

"INPUT AND OUTPUT BUFFERING" (application Ser. No. 10/863,038 filed 8 Jun. 2004), Inventors: Hans Rygh, Morten Schanke, Ola Torudbakken and Steinar Forsmo;

"CODEC IMPLEMENTATION FOR INFINIBAND" (application Ser. No. 10/863,439, filed 8 Jun. 2004), Inventors: Steinar Forsmo, Mathias Hoddevik and Magne Sandven;

"COMMUNITY SEPARATION ENFORCEMENT" (application Ser. No. 10/863,544, filed 8 Jun. 2004), Inventors: Ola Torudbakken and Bjorn Dag Johnsen;

"STUMPING MECHANISM" (application Ser. No. 10/863,372 filed 8 Jun. 2004 Inventors: Brian Manula, Ali Bozkaya and Magne Sandven.

The above-identified applications are all hereby incorporated by reference into the present application.

FIELD

The present invention relates to VCRC checking and generation, and in particular but not exclusively to parallel VCRC checking and generation in an Infiniband device such as a switch.

INTRODUCTION

In Infiniband™ networks, there is a general requirement to reduce the latency through the network and increase the efficiency of devices in the network such that transmission times of packets across the network can be reduced. In traditional Infiniband switches robustness against soft-errors is provided by protection of internal packet buffers. The use of such a technique with an error checking system such as parity or ECC checking necessitates increased buffer sizes, thereby increasing the cost of the chip and causing scalability issues. Additionally, as Infiniband specifies the use of virtual lanes and service levels, it is common for the virtual lane field within an Infiniband packet to alter as the packet passes through the switch from the inbound port to the outbound port. As the virtual lane field is protected by the Variant Cyclic Redundancy Check (VCRC) of the packet, the VCRC therefore has to be checked at the inbound port and calculated at the outbound port. Thus transfer speeds through the switch can be reduced, increasing the latency through the switch.

SUMMARY OF THE INVENTION

The present invention has been made, at least in parts, in consideration of problems and drawbacks of conventional systems.

Viewed from a first aspect, the present invention provides an Infiniband switch. The switch can have an input port logic unit for determining an output virtual lane for a received packet and for storing a descriptor of the determined output virtual lane in a packet field not protected by a checksum field of the packet. The switch can also have a routing unit for transferring the received packet to an output port corresponding to the determined output virtual lane. Additionally, the switch can have an output port logic unit for simultaneously checking the integrity of the packet transferred through the routing unit and calculating a new value for the checksum with the descriptor moved to a correct packet field, which field is included in the calculation of the checksum. This arrangement provides for the use of low cost memory components for implementing the routing unit without sacrificing data integrity, whilst optimising the latency of packet transfer through the chip. Accordingly, the cost of an Infiniband switch chip can be reduced whilst increasing the performance of the chip.

Viewed from a second aspect, the present invention provides an Infiniband device. The device can comprise an input port having a packet processing engine operable to determine an output virtual lane for a received packet and to store data describing the output virtual lane in a header field not protected by an error checking field of the packet and not used during movement of the packet through the switching matrix; and a switching matrix for moving the received packet to an output port corresponding to the determined output virtual lane. The device can also comprise an output port having a packet processing engine operable simultaneously to check the integrity of the packet moved through the switching matrix and to calculate a new value for the error checking field with the data describing the virtual lane moved to a correct header field for that data, which field is protected by the error checking field of the packet. This arrangement provides for the use of low cost memory components for implementing the switching matrix without sacrificing data integrity, whilst optimising the latency of packet transfer through the chip. Accordingly, the cost of an Infiniband switch chip can be reduced whilst increasing the performance of the chip.

Viewed from a third aspect, the present invention provides a method of transferring a packet from an input port of an Infiniband switch to an output port of the switch. The method can comprise: determining at an input port logic core an output virtual lane for the packet; storing data describing the determined output virtual lane in a field of the packet not used for processing of the packet within the switch and not protected by a VCRC field of the packet; passing the packet to a switching mechanism; moving the packet through the switching mechanism on the basis of the stored data describing the determined output virtual lane to an output port associated with the determined output virtual lane; and simultaneously performing at an output port core logic of the output port an integrity check of the packet based on the VCRC field, and determining a new VCRC value for the packet based on the data describing the output virtual lane of the packet correctly positioned in a virtual lane field of the packet, the virtual lane field being protected by the VCRC field. This method allows the use of a low cost memory component to implement the switching mechanism without reducing data integrity. Additionally, the latency of packet transfer through the switch is optimised, thereby providing an optimum performance for the switch.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

Figure 1:
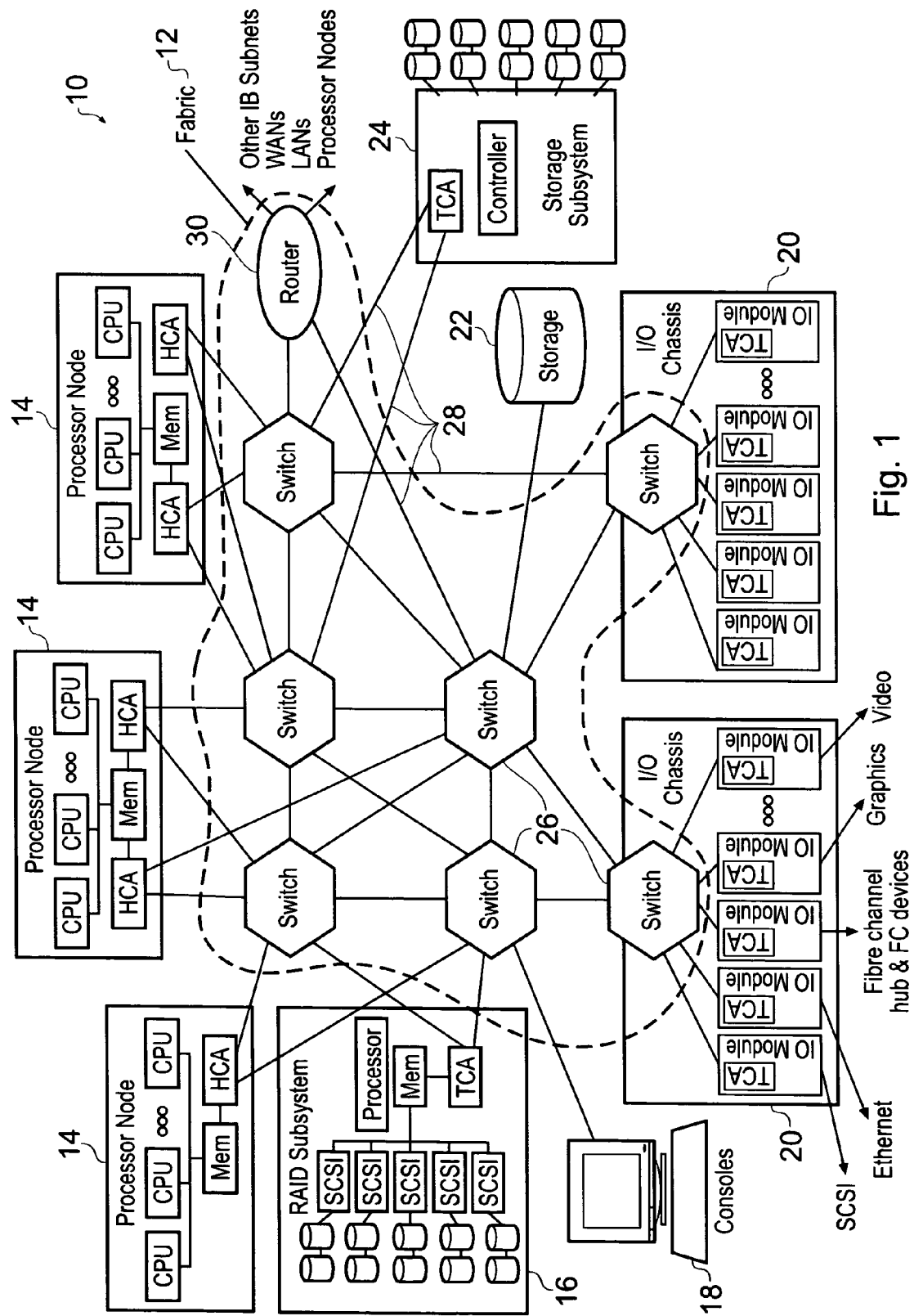
FIG. 1 is a schematic block diagram showing an example of interconnection of computing system elements via the Infiniband™ networking architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 14 may comprise a plurality of processors and each processor may have one or more individual Queue Pairs assigned to handle requests and responses flowing to and from that processor of that processor node 14 via the fabric 12. Alternatively, or in addition, a processor of a given processor node 14 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
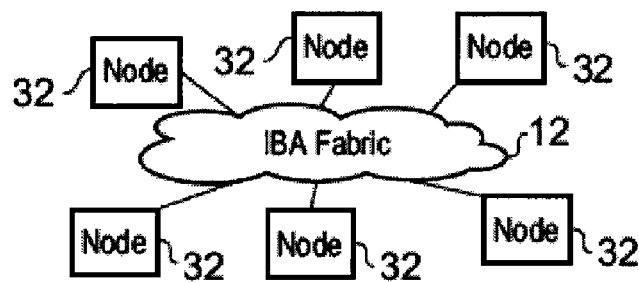
FIG. 2 is a schematic block diagram of a simplified arrangement of an Infiniband™ Architecture system.
Figure 3:
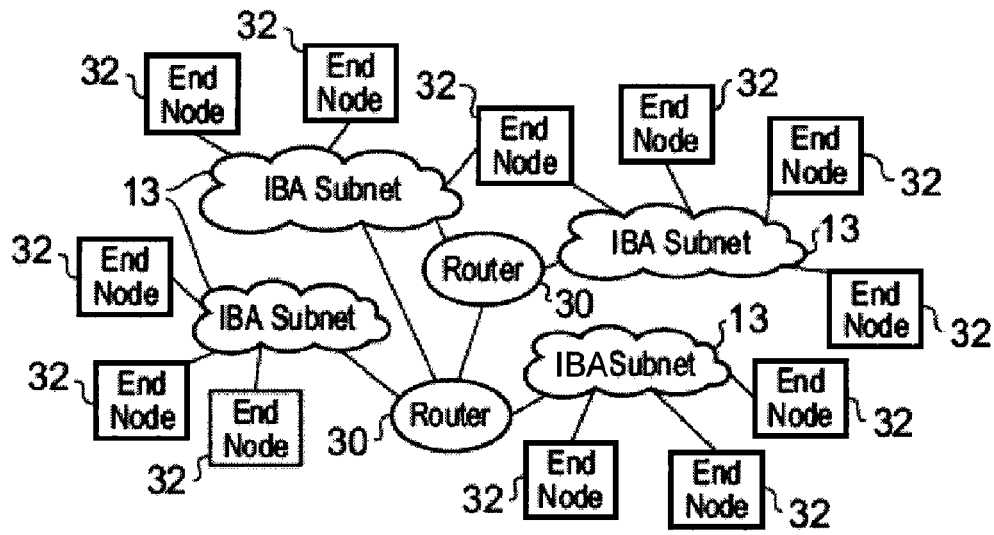
FIG. 3 is a schematic block diagram of another simplified arrangement of an Infiniband™ Architecture system.
Figure 4:
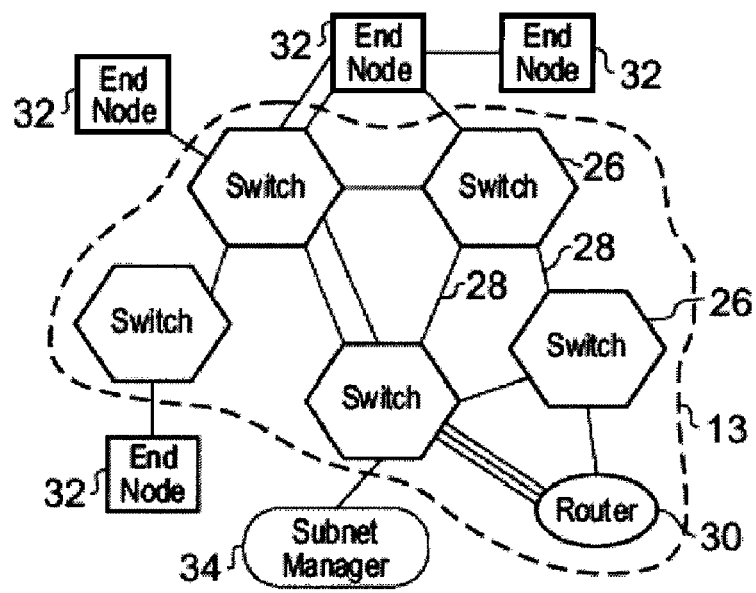
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
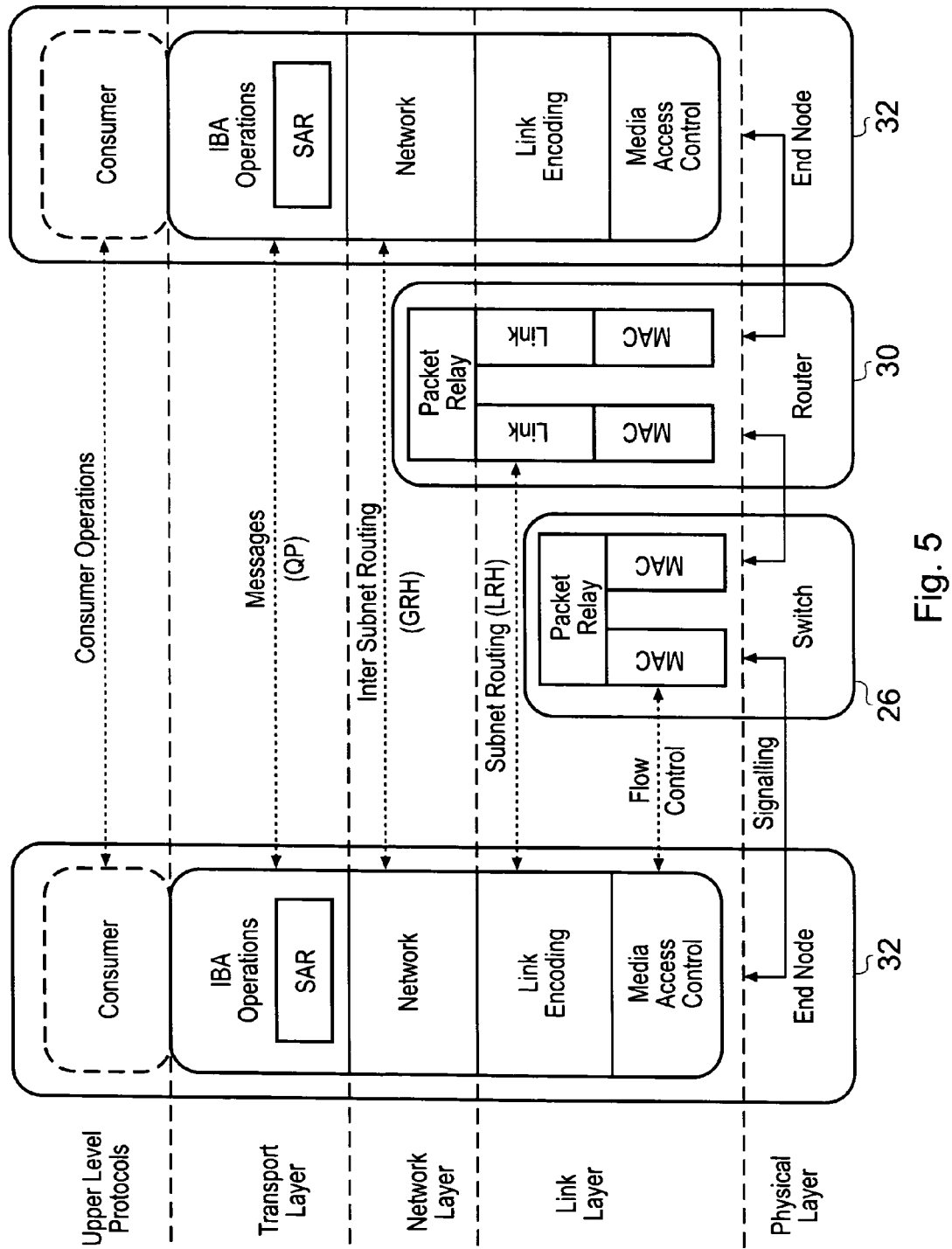
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
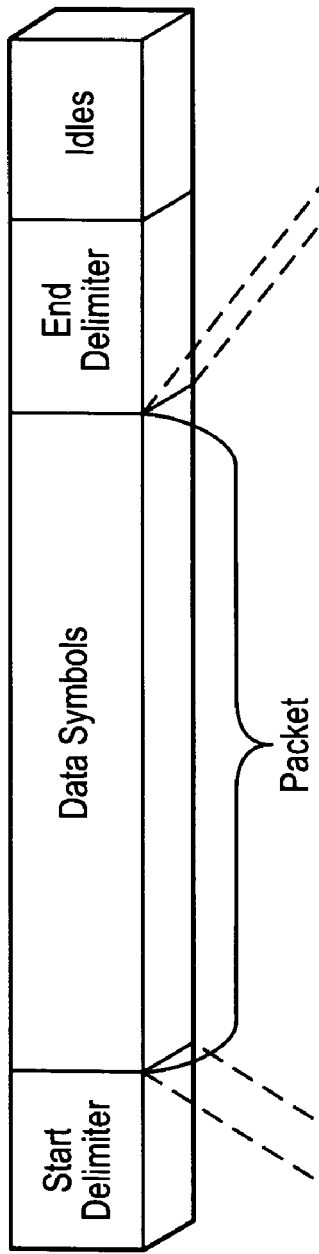
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
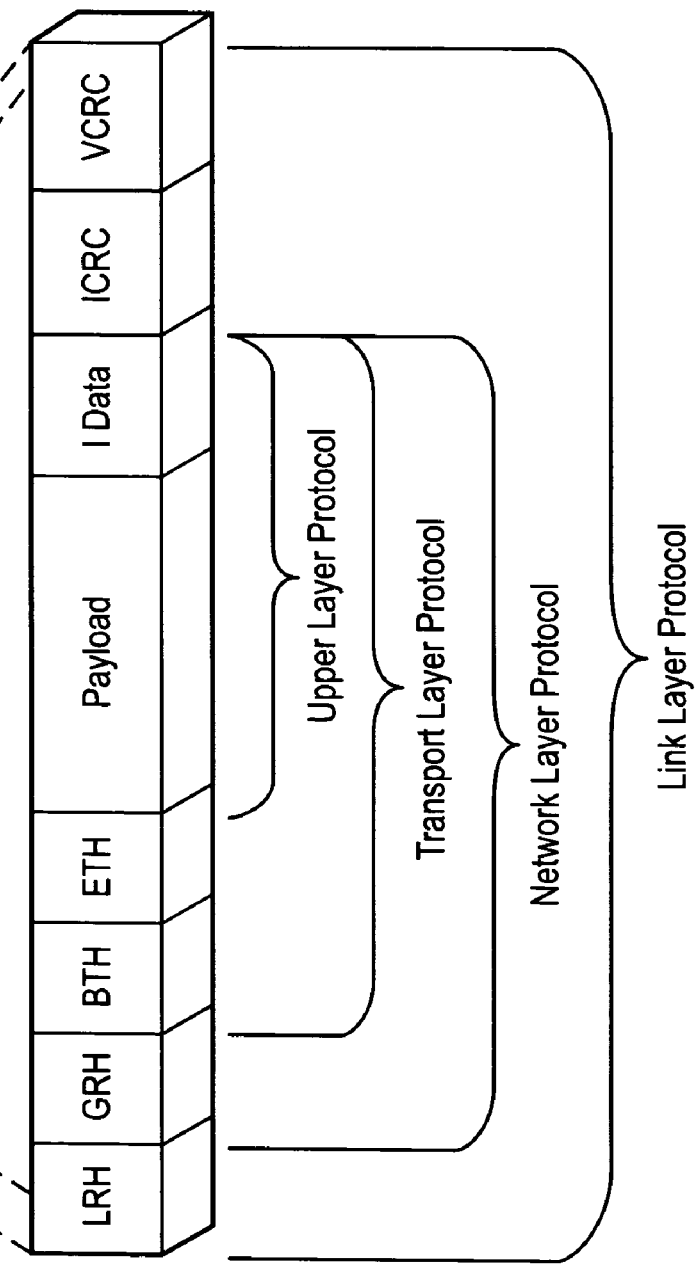
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialization.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialization. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialized for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
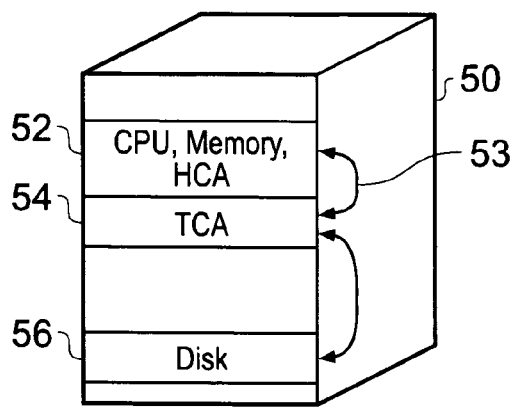
FIG. 8 is a schematic block diagram showing an arrangement where the Infiniband™ Architecture is used to interconnect components within a computer system.
Figure 9:
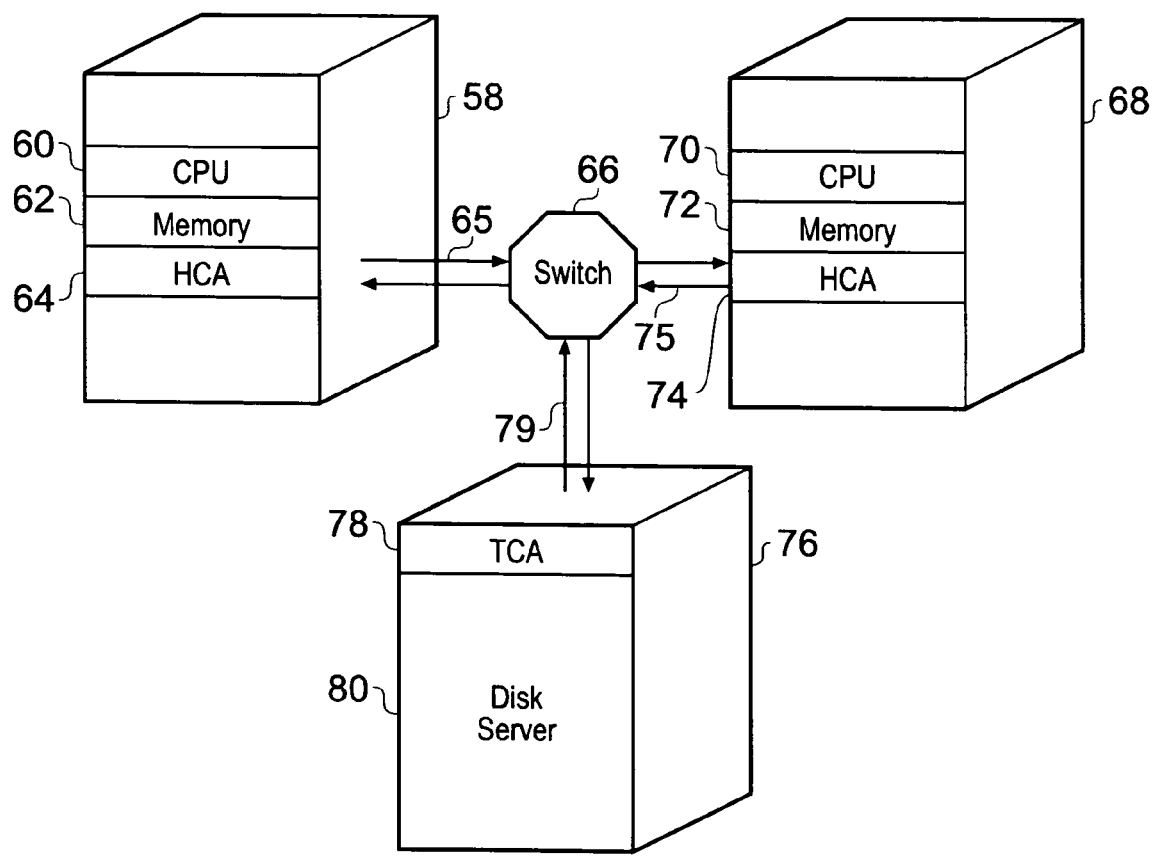
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practiced separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
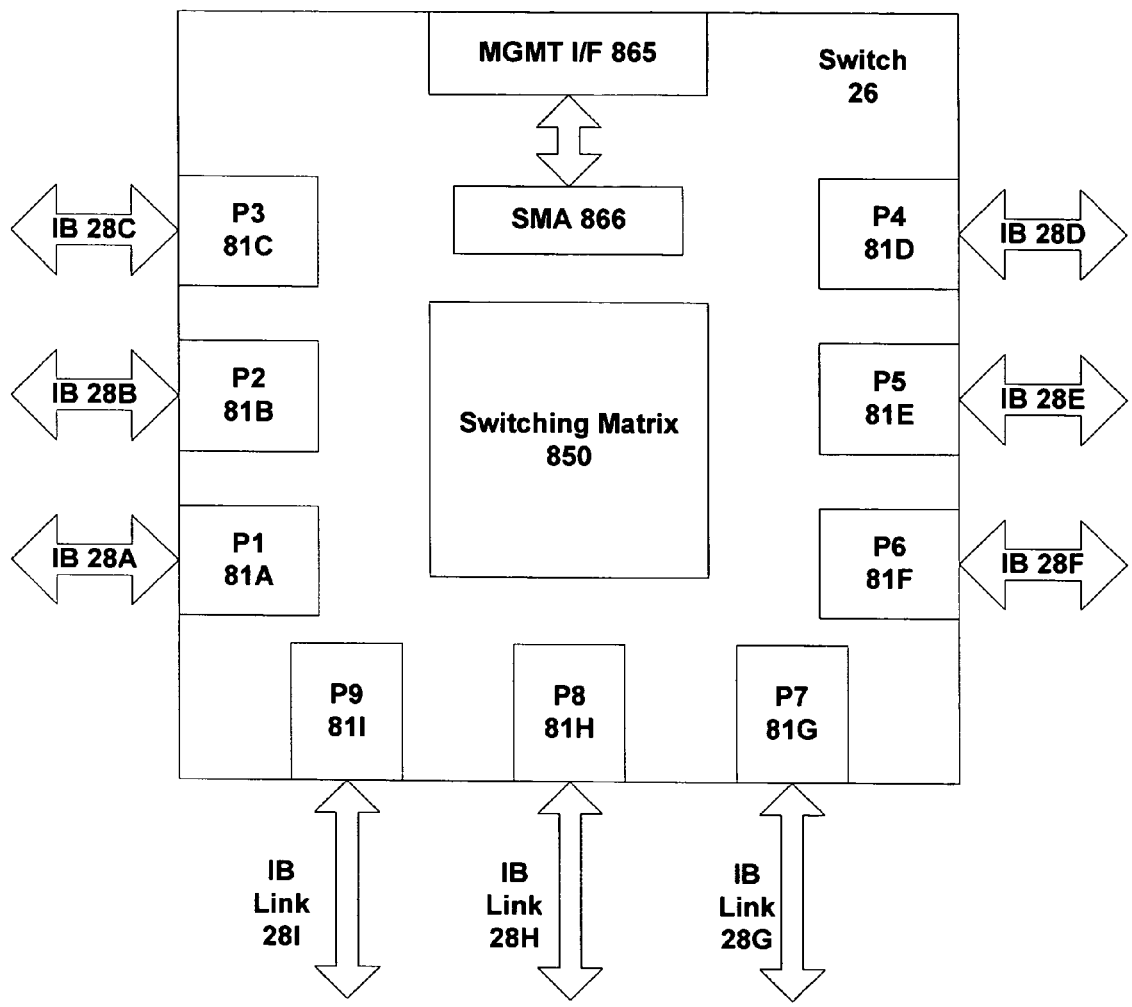
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL 15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

Figure 11:
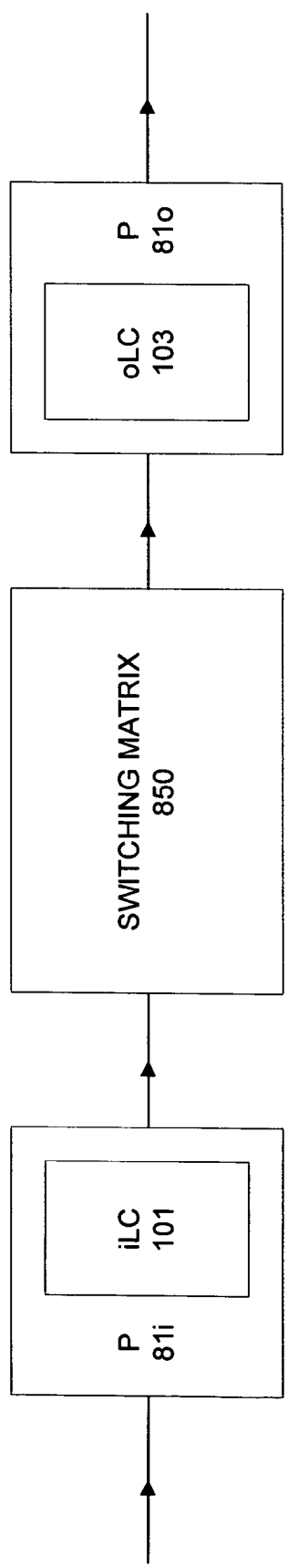
FIG. 11 is a schematic representation of a part of the switch of FIG. 10.

As shown in FIG. 10 above, a switch can have a number of ports 81 interlined by a switching matrix 850. In the present example, each port includes a LinkCore, where a number of checks are performed on the packet to determine whether the packet is to be dropped or passed on. As each port is typically bi-directional, each port has an inbound LinkCore (iLC) and an outbound LinkCore (oLC). In the present example, for the purposes of simplicity of explanation, the inbound port 81*i* is shown in FIG. 11 having an iLC 101 and the outbound port 81*o* is shown as having an oLC 103.

In order to select an outbound port for a received packet, a service level to virtual lane mapping is performed for each packet. This process uses the ultimate destination of the packet and the required service level of the packet to decide both the outbound port and the virtual lane of that port for onward transmission of the packet.

Thus, a packet received at inbound port 811 is processed in the iLC 101, then, if not to be dropped, is forwarded through the switching matrix 850 to the oLC 103 of the outbound port 810 before being forwarded from the outbound port 810. At the iLC 101, one of the checks performed on the packet is a verification check of the VCRC. The packet is then transferred through the switching matrix 850. This can involve the packet being placed in one or more queues within the switching matrix 850. The queues include a number of input queues used to order received packets according to inbound virtual lane and a number of output queues used to order packets for transmission according to outbound virtual lane. Accordingly, there is a possibility of a soft error in any packet stored in such a queue, as such queues are typically implemented using some form of volatile memory and in the present example no error checking capability is provided at the queues. Accordingly, the VCRC is checked again at the oLC 103 to pick up any such soft errors.

As the output queues store the packet according to outbound virtual lane, it is a requirement that the service level to virtual lane mapping is performed prior to writing the packet to the input queue. Accordingly, in the present example, the service level to virtual lane mapping is performed within the iLC 101. However, in order to avoid a requirement for recalculation of the VCRC at the iLC 101 to take account of the changed virtual lane field, the new virtual lane information is in fact stored in an unused field of the packet header which is not included in the VCRC check. The header field which is used is the SDP (Start Data Packet delimiter) field. This field is only used when the packet is between devices and so can be used for other information when the packet is within a device. The switching matrix is configured to interrogate this alternative field for virtual lane information for moving the packet into the correct output queue.

When the packet reaches the oLC 103 of the output port 81*o*, the oLC 103 copies the virtual lane information from the SDP field into the virtual lane field, thus freeing up the SDP field for use for its intended purpose. At this time, the VCRC of the packet as transmitted through the switching matrix 850 is checked to ensure that no soft errors were incurred during that transmission. At the same time, i.e. in parallel, the VCRC for the packet with the updated virtual lane header is calculated ready for onward transmission of the packet.

Thus there has now been described a latency optimised implementation of a method for transmitting a packet through an Infiniband switch, whereby data integrity is maintained without the use of expensive and complex error checking memories for the implementation of queues within the switch. Additionally, time is saved in performing the integrity checking of packets passing through the switch as no time is spent at the input side calculating a new VCRC to take account of updated virtual lane information for the packet, and the integrity check for the packet after passing through the switch, as necessitated by the lack of integrity checking during passage through the switch, takes no extra time at the output side of the switch, as the VCRC needs to be recalculated to take account of the updated virtual lane information as this was not done at the input side, and these two VCRC processes are performed simultaneously. Accordingly, a reduced cost of chip is possible, whilst optimised passage of packets through the switch in terms of latency is achieved without sacrificing data integrity.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An Infiniband device comprising:
   a switching matrix connecting a set of input ports and output ports;
   wherein at least one input port has a packet processing engine to determine an output virtual lane for a received packet and to store header data describing the output virtual lane in a first header field that is not protected by an error check field of the packet and is not used during movement of the packet through the switching matrix;
   wherein at least one output port has a packet processing engine to simultaneously check the integrity of the packet moved through the switching matrix and calculate a new value for the error checking field with the header data describing the virtual lane moved to a correct second header field, which is protected by the error checking field of the packet; and
   wherein after moving the header data describing the virtual lane to the second header field, the first header field is freed for other use.

2. The device of claim 1, wherein the error checking field is the VCRC field.

3. The device of claim 1, wherein the switching matrix comprises a plurality of input queues, each associated with an input port of the device and a plurality of output queues, each associated with an output port of the device, the switching matrix being operable to move packets from the input queues to the output queues on the basis of the virtual lane information stored in the header field of the packet by the input port packet processing engine.

4. The device of claim 3, wherein the input queues and output queues are provided in non-error-checking physical memories.

5. The device of claim 1, wherein the output port packet processing engine is operable to determine whether to allow a packet to be transmitted from the output port on the basis of a result of the check of the integrity of the packet moved through the switching matrix.

6. The device of claim 1, wherein the input port packet processing engine is further operable to check the integrity of the packet received at the input port and to determine whether to allow the packet to be moved to the switching matrix based on a result of that check.

7. The device of claim 1, wherein the device is a switch.

8. An Infiniband switch having an input port logic unit for determining an output virtual lane for a received packet and for storing a descriptor of the determined output virtual lane in a first packet header field which is not protected by a checksum field of the packet; a routing unit for transferring the received packet to an output port corresponding to the determined output virtual lane; and an output port logic unit for simultaneously checking the integrity of the packet transferred through the routing unit and calculating a new value for the checksum with the descriptor moved to a correct second packet header field, which is included in the calculation of the checksum; and wherein after moving the descriptor to the second header field, the first header field is freed for other use.

9. The switch of claim 8, wherein the checksum is a VCRC checksum.

10. The switch of claim 8, wherein the packet field not protected by the checksum field is not used during transfer of the packet via the routing unit.

11. The switch of claim 8, wherein the routing unit comprises a plurality of input buffers, each associated with an input port of the device, and a plurality of output buffers, each associated with an output port of the device, the routing unit being operable for moving packets from the input buffers to the output buffers on the basis of the descriptor stored in the packet field by the input port logic unit.

12. The device of claim 11, wherein the input buffers and output buffers are implemented in non-error-checking volatile memory.

13. The device of claim 8, wherein the output port logic unit is operable for determining whether to allow a packet to be transmitted from the output port on the basis of a result of the check of the integrity of the packet transferred through the routing unit.

14. The device of claim 8, wherein the input port logic unit is further operable for checking the integrity of a packet received at the input port associated with the input port logic unit and for determining whether to allow the packet to be passed to the routing unit based on a result of that check.

15. Infiniband switch means having input port logic means for determining an output virtual lane for a received packet and for storing a descriptor of the determined output virtual lane in a first packet header field which is not protected by a checksum field of the packet; routing means for transferring the received packet to an output port corresponding to the determined output virtual lane; and output port logic means for simultaneously checking the integrity of the packet transferred through the routing means and calculating a new value for the checksum with the descriptor moved to a correct second packet header field, which is included in the calculation of the checksum; and wherein after moving the descriptor to the second header field, the first header field is freed for other use.

16. A method of transferring a packet from an input port of an Infiniband switch to an output port of the switch, the method comprising:

determining at an input port logic core an output virtual lane for the packet;

storing a header data describing the determined output virtual lane in a header field of the packet which is not used for processing of the packet within the switch and is not protected by a VCRC field of the packet;

passing the packet to a switching mechanism;

moving the packet through the switching mechanism on the basis of the stored header data describing the determined output virtual lane to an output port associated with the determined output virtual lane; and simultaneously performing at an output port core logic of the output port an integrity check of the packet based on the VCRC field, and determining a new VCRC value for the packet based on the header data describing the output virtual lane of the packet correctly moved to a virtual lane field of the packet, the virtual lane field being protected by the VCRC field, and wherein after moving the header data describing the output virtual lane to the virtual lane field, the header field is freed for other use.

* * * * *

UNITED STATES PATENT AND TRADEMARK OFFICE
CERTIFICATE OF CORRECTION

PATENT NO.         : 7,483,442 B1  
APPLICATION NO. : 10/863013  
DATED               : January 27, 2009  
INVENTOR(S)      : Ola Torudbakken et al.

It is certified that error appears in the above-identified patent and that said Letters Patent is hereby corrected as shown below:

On the Title page, Item [75] in two places, the first inventor's last name is spelled incorrectly. Please replace "Torudbaken" with --Torudbakken--.

Signed and Sealed this

Thirty-first Day of March, 2009

JOHN DOLL  
*Acting Director of the United States Patent and Trademark Office*